Aug. 18, 1964  R. L. PASCHER  3,144,908
SELECTIVE SECOND HARMONIC CONTROL
Filed Dec. 28, 1962
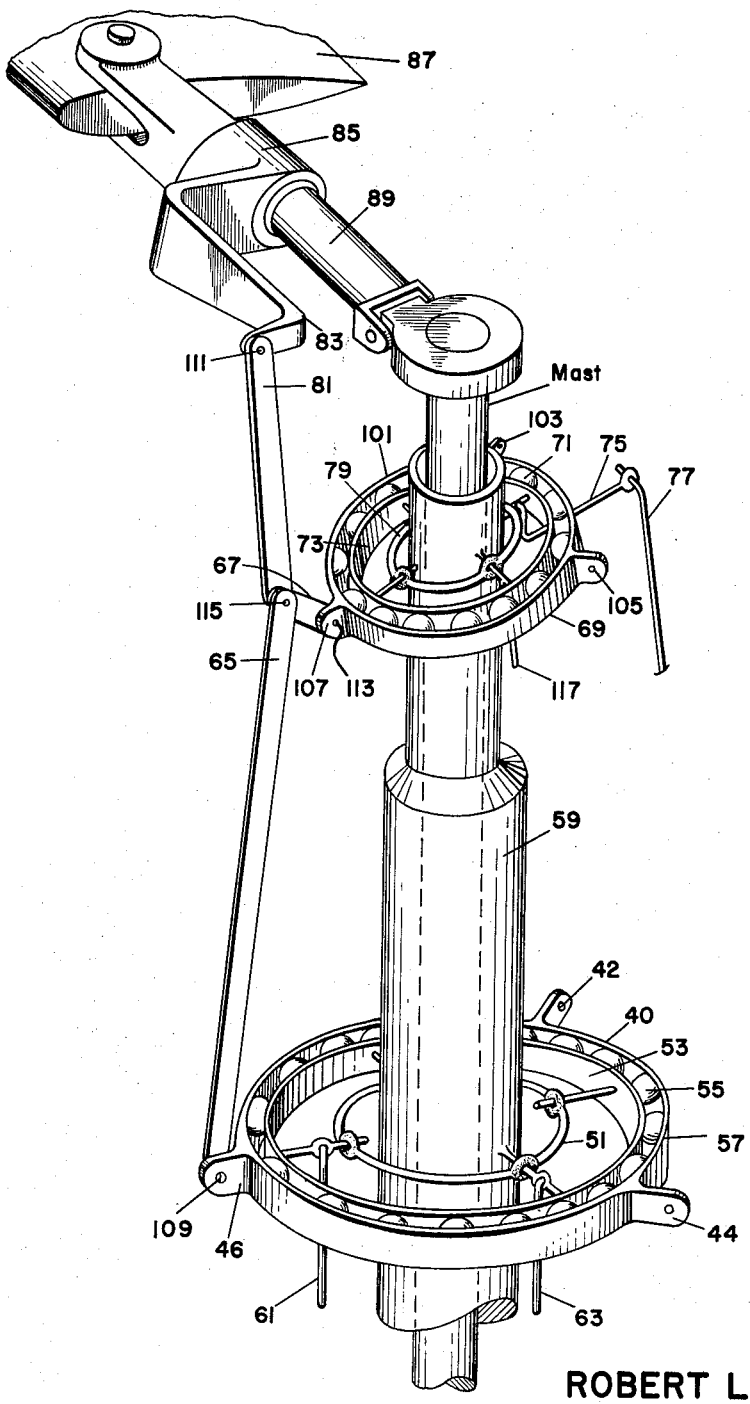
INVENTOR
ROBERT L. PASCHER

3,144,908
SELECTIVE SECOND HARMONIC CONTROL
Robert L. Pascher, Dallas, Tex., assignor to Bell Aerospace, Wheatfield, N.Y., a corporation of Delaware
Filed Dec. 28, 1962, Ser. No. 247,972
7 Claims. (Cl. 170—160.25)

This invention relates generally to rotary wing aircraft, particularly a method for developing second harmonic feathering control in rotary wind aircraft rotors.

This application is a continuation-in-part of applicant's co-pending application Serial Number 141,710 for Selective Second Harmonic Control, filed September 29, 1961, now abandoned.

United States Patent 3,102,597, entitled Method of Second Harmonic Control, and assigned to assignee herein, also deals with the application of second harmonic feathering control to rotary wing aircraft, but that second harmonic control was only adaptable to rotors having an even number of blades. In rotors having an even number of blades one blade is a mirror image of its opposed blade, insofar as the cyclic pitch requirements of the second harmonic feathering control are concerned. At any point in the azimuth of rotation of a rotor having an even number of blades, it is thus desired that the input from the second harmonic feathering control to the diametrically opposed blades be in the same direction and in the same amount. However, in the case of rotors with three or more uneven numbers of blades such feathering is neither desirable nor possible. At any point in the azimuth of rotation of the rotor having three, five or more uneven number of blades, blades must not be instilled with the same amount of pitch nor all changed in the same direction, since the blades are not diametrically, but obliquely opposed.

The present method is adaptable to second harmonic control of rotary wing aircraft having a plurality of rotors and pitch control links interconnecting said rotors and a conventional swashplate. Second harmonic control is achieved by providing an auxiliary or second harmonic swashplate interconnected with the first harmonic swashplate and the rotor so that tilting of the second harmonic swashplate cyclically changes the effective distance between the swashplate and the rotor blades. To provide a more practical second harmonic control system, provision should be made for second harmonic amplitude and phase control. By amplitude control is meant control of the amount or degree of second harmonic pitch that is introduced into the cyclic system. By phase control is meant control of the azimuthal relationship between the first harmonic pitch control (which is the basic or first harmonic swashplate), and the second harmonic cyclic pitch input.

Accordingly, it is an object of this invention to provide an efficient method for second harmonic control of rotary wing aircraft rotors having uneven numbers of rotor blades.

Another object of invention is to provide a method for developing second harmonic control of variable phase and amplitude in rotary wing aircraft.

Yet, additional objects of invention will become apparent from the ensuing specification and attached drawing which is a fragmentary perspective illustrating a suggested application of the method to a three bladed rotor, the coordination of the suggested control structure illustrated with the necessary remaining structure for the rotary wing aircraft being well within the knowledge and ability of persons skilled in the art.

Tube 59 represents a sliding member positioned coaxially with respect to a rotary wing mast and supporting a main or basic swashplate 40 consisting of outer rotating swashplate ring 57, swashplate bearings 55, and inner non-rotating swashplate ring 53. A universal joint 51 is positioned between tube 59 and inner non-rotating swashplate ring 53, permitting tilt of swashplate 40 in any azimuth through levers 61 and 63. Three bosses 42, 44 and 46 protrude from outer rotating swashplate ring 57 to which may be attached controls leading to the three rotor blades, only one of which set of controls is shown connected to fragmentarily illustrated rotor blade 87.

A second harmonic control swashplate 101 is pivoted at the top of tube 59 to universal joint 79 which is attached to swashplate inner non-rotating ring 73. Outer rotating swashplate ring 69 rotates around swashplate bearings 71. Lever 75, having control rod 77 and lever 117 at right angles to lever 75 control the tilt of the second harmonic swashplate 101 in any azimuth and to any degree desired. Three bosses 103, 105, and 107 protrude from rotating outer swashplate ring 69 and are attached respectively to idlers, as boss 107 is attached to idler 67 at point 113. Control rod 65 is pivoted at an end of idler 67 and extends downwardly to boss 46 on outer rotating ring 57 of main swashplate 40. Also pivoted to idler 67 is control rod 81 which extends upwardly to a pivotal connection with pitch horn 83. Pitch horn 83 is bolted to grip 85 which, in turn, extends outboard to connect with rotor blade 87. Movement of the pitch horn 83 by control rod 81 will cause rotor blade 87 to change pitch by movement about journal 89.

When it is desired to introduce second harmonic control to rotor blade 84, control rod 77 is actuated. In the attitude illustrated, control rod 77 has moved upwardly to tilt second harmonic swashplate 101 around its universal joint attachment 79 to tube 59. With blade 87 and its rotating control connections down to basic swashplate 40 in the position as shown, this tilting of the second harmonic control swashplate 101 will cause links 65 and 81 to pivot inwardly, thus effectively shortening the distance between the basic swashplate 40 attachment point 109 and the pitch horn attachment point 111 and causing rotor blade 87 to decrease pitch. As rotor blade 87 rotates it will begin to increase pitch, because attachment point 113 between rotating outer ring 69 and idler 67 will be moving upwardly in the course of its horizontal rotation, thus forcing attachment point 115 between idler 67 and tubes 65 and 81 outwardly and thus causing the pitch horn 83 to move upwardly. At a point of rotation 90° beyond that shown in this figure rotor blade 97 will be at its maximum pitch because the link 67 will lie effectively perpendicular to the line between the attachment point 109 of main swashplate boss 46 and rod 65 and attachment point 111 of pitch horn 83 and rod 81. For the succeeding 90° of rotation the pitch of rotor blade 87 will decrease with the link 67 again being inclined but at this point downwardly in diametrically opposed direction to that shown in the drawing. That is, at a point 180° removed from that shown in FIG. 1, link 67 will be extending downwardly from the second harmonic swashplate 101, but the effect upon links 65 and 81 will be the same as that shown in the drawing. The links 65 and 81 will be effectively shortened and will cause pitch horn 83 to rotate around axis 89 and decrease pitch or rotor blade 87.

The mast drives the rotor blade while the rotating portions of swashplates 101 and 40 can be driven, as is customary in the art, by scissors links (not shown) between the mast and the swashplate which permit tilting and/or vertical motion of the swashplate.

Manifestly, various modifications in the single illustrated structure may be employed without departing from the spirit and scope of invention as defined in the subjoined claims.

I claim:
1. Apparatus for developing second harmonic cyclic pitch control in a rotary-wing aircraft, comprising:
a mast,
a rotor connected to said mast,
a first harmonic swashplate,
a second harmonic swashplate,
said first and second harmonic swashplates mounted adjacent said mast,
control means comprising a plurality of links pivotally connected to each other, one of said links pivotally connected to said rotor and another of said links pivotally connected to said first harmonic swashplate and idler means pivotally attached to said second harmonic swashplate and said links intermediate said rotor and first harmonic swashplate,
whereby actuation of either of said first or second harmonic swashplates introduces a corresponding form of cyclic pitch to said rotor when said rotor is rotated.

2. Apparatus as in claim 1, including control means for tilting said second harmonic swashplate relative to said mast.

3. Apparatus as in claim 2, including a first independently operable control means connected to said first harmonic swashplate and a second independently operable control means connected to said second harmonic swashplate.

4. Second harmonic control means for a rotary-wing aircraft, comprising:
a mast,
a pitch controllable rotor connected to said mast,
a first harmonic swashplate supported adjacent said mast,
a second harmonic swashplate supported adjacent said mast,
link means pivotally connected to said second harmonic swashplate,
first pitch control means pivotally connected to said first harmonic swashplate and to said link means and second pitch control means pivotally connected to said link means and to said rotor.

5. A second harmonic cyclic pitch control device for a rotary-wing aircraft comprising:
a mast,
a pitch controllable rotor connected to said mast, said rotor comprising at least one rotor blade and rotor blade pitch horn,
a first harmonic swashplate universally mounted adjacent said mast, said first harmonic swashplate including a rotatable and a non-rotatable portion,
a second harmonic swashplate pivotally mounted adjacent said mast, said second harmonic swashplate including a rotatable and a non-rotatable portion,
link means pivotally attached at one end to the rotatable portion of said second harmonic swashplate and at the other end to first and second pitch control means intermediate said rotor and first harmonic swashplate, said first pitch control means pivotally attached to the rotatable portion of said first harmonic swashplate means and said second pitch control means pivotally attached to said pitch horn.

6. Apparatus for controlling the tip path plane of a rotor attached to a rotary-wing aircraft, comprising:
a first swashplate,
a second swashplate,
said swashplates mounted on the structure of said aircraft,
a plurality of links pivotally connected to each other and pivotally interconnecting said first swashplate to the rotor and a pivotal connection directly from said second swashplate to said links whereby actuation of either of said first or second swashplates introduces a corresponding control to said rotor when said rotor is rotated.

7. Apparatus as in claim 6, including control means for pilot actuation of each of said swashplates.

References Cited in the file of this patent

UNITED STATES PATENTS

| | | |
|---|---|---|
| 2,256,635 | Young | Sept. 23, 1941 |
| 2,497,465 | Mullin | Feb. 14, 1950 |
| 2,677,429 | Laufer | May 4, 1954 |
| 2,748,876 | Daland | June 5, 1956 |
| 2,983,319 | Kaman | May 9, 1961 |
| 3,031,017 | Arcidiacono | Apr. 24, 1962 |

FOREIGN PATENTS

| | | |
|---|---|---|
| 848,213 | Great Britain | Sept. 14, 1960 |
| 1,213,762 | France | Nov. 2, 1959 |
| 443,854 | Italy | Jan. 7, 1949 |